Nov. 8, 1960 P. M. DREPTIN 2,959,156
HYDRAULIC SERVO-DEVICE FOR CONTROLLING LINEARLY OR
ROTATABLY MOVABLE MEMBERS, WITH INDICATION
OF THE POSITION THEREOF
Filed July 29, 1957 3 Sheets-Sheet 1

INVENTOR
P. M. Dreptin
By
ATTORNEYS

Nov. 8, 1960

P. M. DREPTIN 2,959,156

HYDRAULIC SERVO-DEVICE FOR CONTROLLING LINEARLY OR
ROTATABLY MOVABLE MEMBERS, WITH INDICATION
OF THE POSITION THEREOF

Filed July 29, 1957

INVENTOR
P. M. Dreptin

By *Holcomb, Wetherill & Brisebois*

ATTORNEYS

2,959,156
Patented Nov. 8, 1960

United States Patent Office

2,959,156

HYDRAULIC SERVO-DEVICE FOR CONTROLLING LINEARLY OR ROTATABLY MOVABLE MEMBERS, WITH INDICATION OF THE POSITION THEREOF

Paul Maurice Dreptin, Issy-les-Moulineaux, France, assignor to Societe a Responsabilite Limitee dite: Ratier Aviation-Marine, Montrouge, France, a corporation of France Filed July 29, 1957, Ser. No. 674,891

Claims priority, application France Aug. 3, 1956

2 Claims. (Cl. 121—41)

The present invention has for its object a hydraulic device adapted to cause by a mere variation in the output pressure of a pump or other appropriate generator any linearly or rotatably movable members to be displaced and to be stopped at any desirable location of the course thereof and to provide an indication of the position of said members, each position corresponding to a given pressure.

The device according to the present invention in the case of its application to the control of members having a rectilinear movement comprises in combination a pressure generator unit, a manually operable servo-controlling unit, a servo-motor unit for servo controlling said displacements and a position indicator.

In the case where said device is used for controlling rotating members, the same comprises in addition to the aforesaid structure components a centrifugal governor by which the control is made automatic, tthe connection between the rotary and fixed parts being insured by means of a fixed distributor bearing.

In order that the invention be better understood, there will be now described two illustrative and in any way limitative embodiments given as examples and shown in the annexed drawings.

Figure 1:
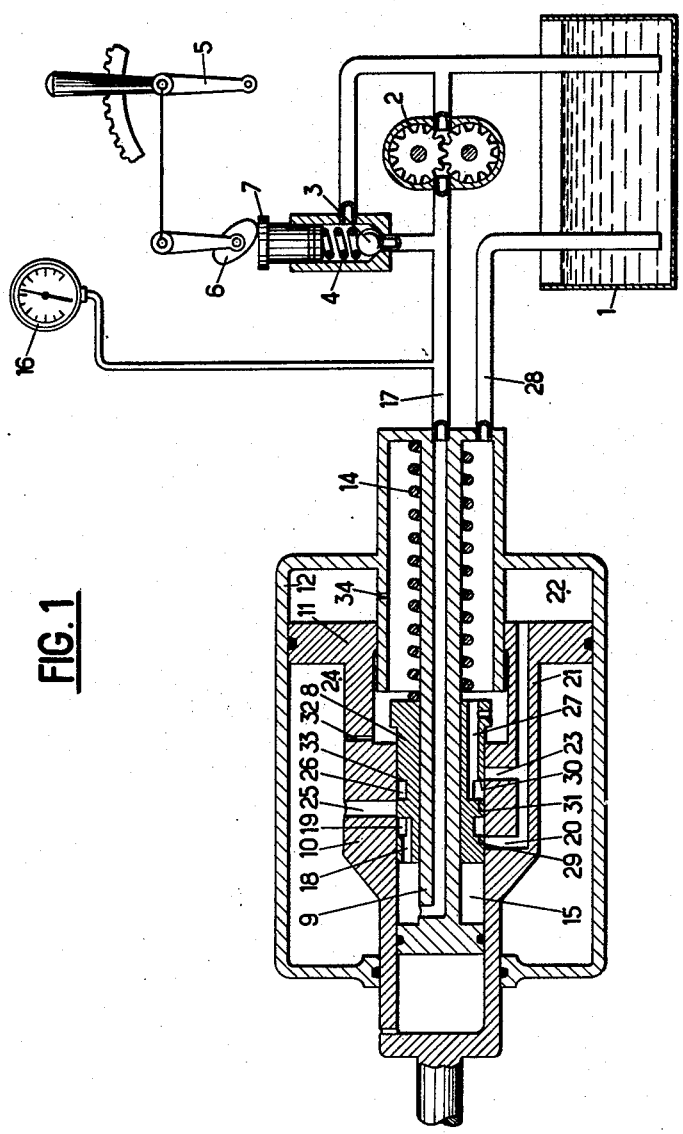
Fig. 1 is a schematic sectional view of one of the aforesaid embodiments which may be applied to the control of rectilinearly movable members.

Referring to the drawings, the pressure generator unit of the device shown in Fig. 1 comprises a fluid tank 1 supplying a fluid pump 2 the output of which is regulated in pressure by the servo-control unit above referred to. Said servo-control unit comprises a metering valve 3 which is biased by a spring 4 the tension of which may be varied at will through any appropriate means, such as for example a remote control 5 acting on a cam 6 whose movements modify the position of a bearing stop 7 for the spring 4.

The servo-motor unit comprises a servo-controlling valve 8 sliding on a fixed pressure inlet tube 9 connected to the pump 2. Said valve is slidably mounted in a body 10 integral with a double acting power piston 11 reciprocating in a cylinder 12, the movements of said piston being controlled by a set of appropriate ports. Said valve is biased by a spring 14 counteracting the pressure existing in a chamber 15 on the surface between the aforementioned power piston 11 and the fixed tube 9.

The position indicator of piston 11 is constituted by a pressure gauge 16 provided with a linear movement scale and showing immediately the compression amount of the spring 14 by measuring the pressure necessary for balancing the valve 8.

The operation of the device thus realized based upon a balance between two opposing forces balancing a fluid pressure distributor is within the field of hydraulic servo-controls, with such a particular that the control pressure is at the same time the servo-control one.

Figure 2:
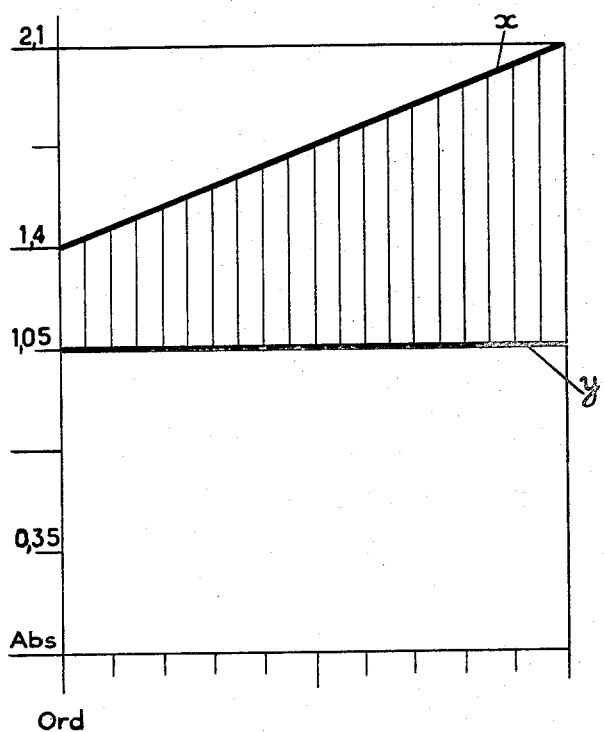
Fig. 2 is a diagram representing curves showing the comparative values of the pressions necessary to the device operation.

It is then sufficient, as it may be understood by referring to Fig. 2, that the pressure necessary for the piston displacement is lower than the counteracting pressure of the servo-control.

In Fig. 2 there has been shown piston 11 linear movements in abscissae and the pressures in pounds per square inch in ordinates.

The $x$ curve represents the unitary values of the servo pressure opposed to the counteracting spring 14 according to the movements.

The $y$ curve shows the unitary pressure necessary for the power piston movements.

The area between curves $x$ and $y$ represents the available pressure versus the compression amount of said spring 14.

From an examination of said diagram, it appears that at any time of the stroke of the piston 11 a pressure excess is available which insures the operation safety.

The so described device operates in the following manner:

For each position of cam 6 there corresponds by means of spring 4 a different metering of the control pressure delivered by pump 2. Such pressure is delivered through a line 17 to the chamber 15 in which it counteracts the action of spring 14 on the sectional area of the servo-controlling valve 8. Said pressure acting in opposed relationship with the thrust from the spring 14 stabilizes said valve in some position. Apart from the position variations of piston 11, the output of pump 2 flows completely under the metering valve 3 to return to the supply.

In order to move towards the left, as shown in Fig. 1, the piston 11 and thus the member or members integral therewith, it is only necessary that the pressure be lowered. For that purpose, the manually operable remote control lever 5 is moved by some angle in the appropriate direction. By means of the bearing stop 7 the cam 6 slightly relieves the servo-control spring 4. As the pump output meets now but a reduced resistance in flowing under the metering valve 3, the pressure is lowered in line 17 and chamber 15. The thrust of spring 14 which bears on valve 8 becomes predominant and the latter moves leftwards by some distance. As soon as said valve is thrown off its balance point (the point where the hydraulic thrust was equal to the opposing spring 14 thrust) the pressure which had found its way from chamber 15 to an orifice 18 and an annular groove 19 enters the chamber 22 in cylinder 12 through an orifice 20 and a line 21, an orifice 23 being out of flow circuit. At the same time the fluid amount which was stored in the chamber 24 in cylinder 12 is forced through the orifice 25 into the annular groove 26 and the lines 27 and 28 towards tank 1.

The power piston 11 is biased by the pressure and follows the valve leftwards with a slight delay allowing for the fluid inlets, until the instant where the pressure in chamber 15 balancing again the thrust of spring 14, said valve becomes stable.

At this moment, the piston 11 is driven back to starting position, the land 29 of the circular groove 19 closes the orifice 20 communicating with the cylinder chamber 22, and the land 30 of the circular groove 26 closes the orifice 25 in communication with the chamber 24.

The device becomes stable in such a position that a slight fluid inlet is established in chamber 24 on the land 31 of the circular groove 19, and maintains in said chamber the pressure necessary to overcome the reaction forces of the members to be operated and integral with piston 11, the throughput of such pressure flowing through a flow bleed port 32.

When the resistances from the member or members to be operated exist in opposed directions, the fluid incoming for maintaining the aforesaid reaction forces is established in chamber 22 on the land 29 of the circular groove 19, and the throughput flows through the metering orfice 34.

The pressure gauge 16, which shows the pressure value which balances the action of spring 14, indicates the compression amount of the latter and thus the accurate position of piston 11.

The displacement of piston 11 from left to right is obtained by increasing the pressure, which can be made by moving the lever 5 in the opposite direction of the preceding movement thereof. The cam 6, by the intermediary of stop 7 compresses the servo-control spring 4, thus increasing the pressure in line 17 and chamber 15. The hydraulic thrust becomes predominant relative to the thrust of spring 14 which bears on valve 8. Thus, the latter is shifted rightwards. As soon as valve 8 is thrown off the balance point thereof, the pressure which had found its way from chamber 15 into the orifice 18 and the circular groove 19 flows into the chamber 24 in cylinder 12 via orifice 25. Simultaneously, the fluid amount stored in the aforesaid chamber 22 is forced through line 21 and orifice 23 into the groove 26 and line 27 to be led back to tank 1 via line 28. The orifice 20 is out the flow circuit.

The power piston 11 which is biased by the pressure in its chamber 24 is moved rightwards while following the valve 8 still with a slight delay until the thrust of spring 14 acting on valve 8 balances again the hydraulic thrust.

At this moment, the piston reaches its starting position on valve 8, closing the outlet of chamber 22 by means of the land 33 of groove 26 on orifice 23 and choking the inlet to chamber 24 by the land 31 of groove 19. Thus, the device is stabilized as in the preceeding case.

Figure 3:
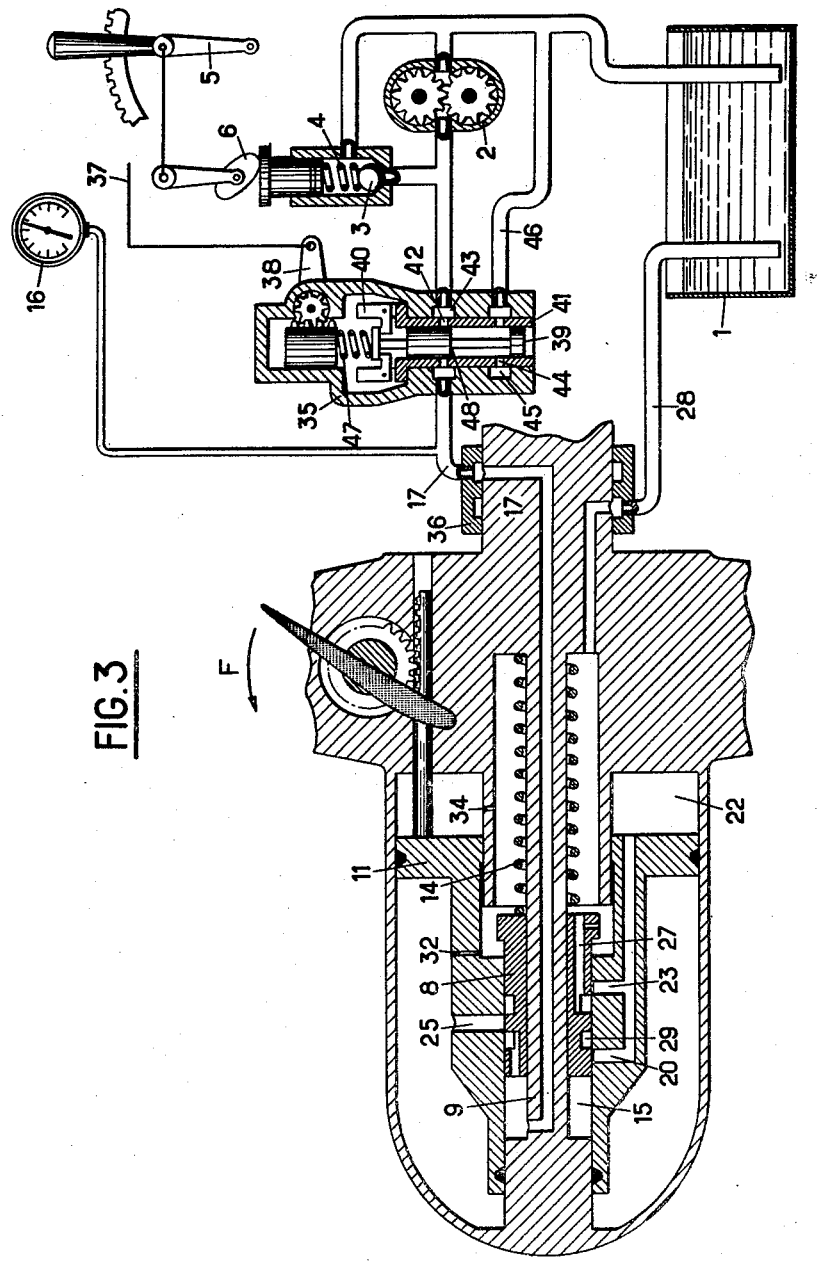
Fig. 3 is a view similar to Fig. 1 representing the second of the abovementioned embodiments which may be applied to the control of rotating members.

The embodiment shown in Fig. 3 may be applied in case of a rotating equipment. It may for example, be used to provide pitch changes in a variable pitch propeller. In such case, the servo-motor unit is made rotatable and the device, according to the present invention, comprises in addition to the equipment described with reference to Fig. 1, a centrifugal governor 35 driven by the propeller shaft and a distributing bearing 36 providing the connection between the fixed and rotary parts. Said governor 35 comprises a spring 47 acting in a well-known manner against the centrifugal weights 40.

Said governor when manually operated is locked in closed position (with the slide thereof in lower position) by means of a remote control 37 acting on a lever 38 cooperating with the aforementioned spring 47.

On the other hand, the servo-motor unit is used as a pressure limiter (thus as a stroke limiter for displacements towards the maximum pressure during regulating operations). This is an important advantage in the case of variable pitch propellers whose pitch should not be lowered below a prescribed pitch. In Fig. 3 the arrow F represents the pitch reduction.

The governor 35 comprises therein, as far as the hydraulic part thereof is concerned, a slide 39 responsive to the variations of the centrifugal weights 40 which depend upon the rotation rate. Said slide reciprocates in a sleeve or bushing 41 comprising ports 42 cooperating with the circular groove 43 of the pressure circuit 17 and ports 44 cooperating with the circular groove 45 of the return circuit 46.

During governing, operation of the device operates as follows: the servo-control unit being adjusted at the maximum desired pressure and the lever 38 of governor 35 set in the "governing" position, the slide 39 controlled by the weights 40 is responsive to rotation rate variations.

(a) *Position corresponding to stability*

Centrifugal weights 40 being in a balance position, the slide 39 is disposed in such a manner that its land 48 permits a certain amount of fluid from ports 42 to flow towards the return circuit 46. Valve 3 rests on the seat thereof.

(b) *Reducing of the rate (reducing of the pitch)*

The centrifugal weights 40 when moving towards each other cause slide 39 to be lowered. The slide land 48 partially closes the bleeding ports 42 in circuit 17. The pressure increases in chamber 15 and valve 8 is caused to be shifted rightwards as in the case of Fig. 1 (increasing of pressure). Thus, the pressure responsive power piston 11 is caused to move and stabilize again the rate. However, the maximum pressure in chamber 15 can never be higher than the calibrating pressure of valve 3, thus limiting the pitch minimum value of the propeller blades.

(c) *Increasing of the rate (increasing of the pitch)*

The centrifugal weights 40 when moving apart from each other cause the slide 39 to be elevated. The land 48 thereof increases slightly bleeding through the ports 42. The pressure is lowered in circuit 17 and the stabilized position is resumed as in the case of Fig. 1 (lowering of the pressure).

It is to be understood that the embodiments of the present invention as described and shown in the drawings have been given only as illustrative without limiting the invention in any way, as those skilled in the art may conceive any possible or desirable changes without departing from the spirit of the invention and as shown in the appended claims.

What I claim is:

1. Means for controlling the position of a movable member comprising in combination a source fluid under varying pressure, a pressure chamber, fluid transfer means connecting one end of said pressure chamber to the output side of said pressure source and the opposite end of said pressure chamber to the input side thereof, a valve member slidable within said chamber, and a spring biasing said valve member away from said opposite end of said chamber against the pressure delivered by said pressure source, slidable piston means in said pressure chamber encircling said valve member and operatively connected to said movable member, said valve means controlling the flow of pressure fluid to the faces of said piston to urge it to a constant position relative to said valve member, adjustable pressure regulating means and a pressure indicator connected between the said output side of said pressure source and said pressure chamber, said indicator being responsive to the pressure exerted against said valve and spring and consequently indicating the position of said valve member, piston and movable member.

2. A fluid pressure system for controlling the position of a movable member comprising a pressure actuated servo-motor supplied by a source of fluid under pressure, a movable member the position of which is controlled by said servo-motor, pressure regulating means and pressure indicating means connected between the output side of said pressure source and said servo-motor, said servo-motor comprising a spring biased valve member the position of which is dependent upon the pressure supplied to said motor and determines the position of said movable member so that the reading on said indicating device indicates the position of both said valve member and movable member.

(References on following page)

References Cited in the file of this patent

UNITED STATES PATENTS

| | | |
|---|---|---|
| 1,732,813 | Kasley | Oct. 22, 1929 |
| 2,177,098 | Doe et al. | Oct. 24, 1939 |
| 2,423,191 | Kopp | July 1, 1947 |
| 2,456,361 | Atteslander | Dec. 14, 1948 |
| 2,495,669 | Cannon | Jan. 24, 1950 |
| 2,518,925 | Nussbaum | Aug. 15, 1950 |
| 2,754,806 | Funston | July 17, 1956 |

FOREIGN PATENTS

| | | |
|---|---|---|
| 583,185 | Germany | Nov. 3, 1933 |